3,280,111
PENICILLIN DERIVATIVES
Emilio Testa, Vacallo, Tessin, Switzerland, and Giorgio Cignarella, Giorgio Pifferi, and Bruno J. R. Nicolaus, Milan, Italy, assignors to Lepetit S.p.A., Milan, Italy
No Drawing. Filed Apr. 2, 1962, Ser. No. 184,539
Claims priority, application Great Britain, Apr. 14, 1961, 13,585/61
11 Claims. (Cl. 260—239.1)

This invention relates to new penicillins derived from 6-aminopenicillanic acid of the formula:

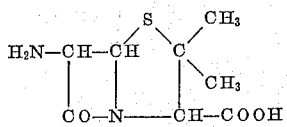

which possess high antibacterial activity and may be used in treating both human and animal infections.

Some new penicillins have been prepared in recent years by acrylating the well known 6-aminopenicillanic acid, especially in view of some particularly interesting properties, peculiar to a certain number of them, including that of being effective against penicillinase-producing strains of bacteria.

This invention is more particularly concerned with the preparation of new penicillins of the general formula:

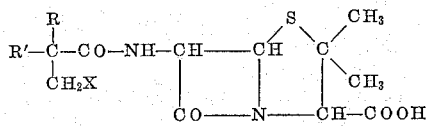

wherein R and R′ are the same or different members of the class consisting of lower alkyl, aryl, aralkyl, X is a member of the class consisting of halogen and acryloxy, and non toxic salts thereof.

The non-toxic salts include non-toxic metallic salts, such as sodium or potassium and non-toxic organic salts such as dibenzylethylenediamine (DED) salts or the like, commonly used in the field of penicillins.

For instance organic bases which may be useful to this purpose are tri(lower)alkylamines, such as trimethyl- or triethylamine; procaine, dibenzylamine, N-benzyl-β-phenethylamine, 1-ephenamine, N,N′-bis-dehydroabietylethylenediamine, N,N′-dibenzylethylenediamine and dehydroabietylamine.

The process for preparing the new penicillins consists in reacting 6-aminopenicillanic acid for a fermentation liquor containing it with an acrylating agent such as carboxylic acid halide or anhydride derived from an α,α-disubstituted propionic acid of the following formula:

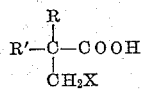

wherein R, R′ and X are as defined above, in the presence of an alkali metal carbonate or bicarbonate or a tertiary amine base as a proton-acceptor, in an inert anhydrous organic solvent.

These acids are also new and are prepared starting from β-hydroxy-acid lactones by ring cleavage in alkaline medium and subsequent acrylation, when X is acryloxly, and in the case in which X is halogen, directly by ring cleavage with the appropriate hydracid.

The new penicillins of the present invention possess the advantage of being less sensitive to penicillinase than the known penicillins.

We reported the minimum active concentrations in vitro (γ/ml.) of some of the new penicillins against two penicillinase producing strains of bacteria, isolated from pathological sources in comparison with the correspondent values of penicillin G:

|  | Staph. PV 43 | Staph. PV 46 |
|---|---|---|
| Inoculum size | $2.10^6$ | $2.10^6$ |
| Penicillin G | >100 | >100 |
| α-Phenyl-α-isopropyl-β-acetoxyethylpenicillin | 5 | 5 |
| α-Phenyl-α-n-butyl-β-acetoxyethylpenicillin | 2 | 5 |
| α-Phenyl-α-benzyl-β-acetoxyethylpenicillin (DED salt) | 5 |  |
| α-Phenyl-α-isopropyl-β-bromoethylpenicillin (K salt) | 1 | 2 |
| α-Phenyl-α-n-butyl-β-bromoethylpenicillin (DED salt) | 2 | 5 |
| α-Phenyl-α-benzyl-β-bromoethylpenicillin (K salt) | 2 | 2 |

Moreover some of the new penicillins show a high degree of stability towards acidic media. This property combined with the effectiveness described above against penicillinase producing strains of bacteria is the most important feature of these new penicillins.

It is known that the sensitivity of the conventional penicillins has represented a great obstacle to the use of these antibiotics by oral route. The discovery of penicillin V resolved partially this problem by allowing the oral administration, but still retaining the disadvantage of being ineffective against resistant strains of bacteria. Owing to their stability both towards acids and penicillinase, the new penicillins increase to a very great extent the possibilities of oral therapy.

The resistance to acids is illustrated by the following table in which the percent of non-affected penicillin at different times in HCl N/10 is given:

| Time | 0 min. | 15 min. | 30 min. | 1 hour |
|---|---|---|---|---|
| Penicillin G (Na salt) | 100 | 12.1 | 1.73 |  |
| Penicillin V | 100 |  | 89.8 | 75.4 |
| α-Phenyl-α-ethyl-β-bromoethylpenicillin (DED salt) | 100 |  | 76.6 | 47.6 |
| α-Phenyl-α-n-butyl-β-acetoxyethylpenicillin | 100 |  | 71.1 | 54.5 |
| α-Phenyl-α-benzyl-β-acetoxyethylpenicillin (DED salt) | 100 |  | 92.0 | 80.1 |
| α,α-Diphenyl-β-bromoethylpenicillin (DED salt) | 100 |  | 97.0 | 96.5 |
| α-Phenyl-α-n-butyl-β-bromoethylpenicillin (DED salt) | 100 |  | 90.2 | 83.0 |
| α-Phenyl-α-benzyl-β-bromoethylpenicillin (K salt) | 100 |  | 95.8 | 93.0 |
| α-Phenyl-α-isopropyl-β-bromoethylpenicillin | 100 |  | 70.5 | 62.1 |

The following non-limitative examples illustrate the invention.

EXAMPLE 1

*α-Benzyl-α-phenyl-β-acetoxyethylpenicillin*

To 11.8 g. of α-phenyl-α-benzyl-β-propiolactone dissolved in 200 ml. ethanol, 200 ml. of 10% NaOH are added, and the mixture is refluxed for 2 hours. Then the organic solvent is removed in vacuo and the aqueous solution is acidified with 20% H₂SO₄ to give 13 g. of α-benzyl-α-phenyl-β-hydroxypropionic acid, M.P. 186–190° C. Thirteen grams of α-benzyl-α-phenyl-β-hydroxypropionic acid are refluxed for 3 hours in 40 ml. acetic anhydride. The excess acetic anhydride is removed in vacuo and to the oily residue 40 ml. SOCl₂ are added. The mixture is refluxed for 2 hours, then the thionyl chloride is removed in vacuo and the oily residue distilled to give 11.7 g. of α-phenyl-α-benzyl-β-acetoxypropionyl chloride, B.P. 155–160° C./0.8 mm. Hg.

To 18 g. of 6-aminopenicillanic acid dissolved in 200 ml. anhydrous chloroform, 39 ml. of triethylamine is added portionwise at room temperature and the mixture is kept under stirring for ten minutes. Then 40 g. of α-phenyl-α-benzyl-β-acetoxypropionyl chloride in 150 ml. of anhydrous chloroform are added dropwise at 0–4° C. Stirring is continued for 1 hour at room temperature. The mixture is treated with N HCl enough to reach pH 2.5. The organic phase is washed with water, dried over Na₂SO₄ and the solvent removed in vacuo. The residue is taken up with ether and treated with potassium α-ethylhexanoate. Yield 1.7 g. of potassium α-benzyl-α-phenyl-β-acetoxyethylpenicillin, M.P. 110–115° C. The dibenzylethylenediamine salt of the same melts at about 120° C.

EXAMPLE 2

α-Phenyl-α-isopropyl-β-bromoethylpenicillin

Into 150 ml. of glacial acetic acid a stream of gaseous hydrogen bromide is bubbled at room temperature, lowering at the end the temperature to 0.5° C. to complete saturation. Then a solution of 26.5 g. of α-phenyl-α-isopropyl-propionolactone in 50 ml. of glacial acetic acid is added dropwise with stirring. The mixture is allowed to stand for 2 hours and then warmed at 80° C. for two hours. After cooling the acetic acid is distilled off in vacuo, the residue is taken up with H₂O-diethyl ether, the organic phase washed until neutral to congo red, dried over Na₂SO₄ and filtered. The solvent is removed and the oily residue treated with petroleum ether gives 25 g. of crystalline α-phenyl-α-isopropyl-β-bromopropionic acid, M.P. 104–105° C.

To 23 g. of α-phenyl-α-isopropyl-β-bromopropionic acid, 30 ml. of thionyl chloride are added with stirring. The mixture is refluxed for 3 hours. The excess thionyl chloride is removed and the residue distilled in vacuo to give 23 g. of α-phenyl-α-isopropyl-β-bromopropionyl chloride, B.P. 130–135° C./0.5 mm. Hg.

To 30 g. of 6-aminopenicillanic acid dissolved in 250 ml. of anhydrous chloroform, 39 ml. of triethylamine are added at room temperature. Stirring is continued for 10 minutes, then the mixture is cooled to 0.4° C. and a solution of 40 g. of α-phenyl-α-isopropyl-β-bromopropionyl chloride in 150 ml. of anhydrous chloroform is added dropwise with stirring. At the end of the addition stirring is continued for 1 hour at room temperature, then the solution is treated with N HCl enough to reach pH 2.5; the organic layer is washed with H₂O and dried over Na₂SO₄; the organic solvent is removed in vacuo and the oily residue taken up with anhydrous diethyl ether and treated with potassium α-ethylhexanoate to give 43 g. of potassium α-phenyl-α-isopropyl-β-bromoethylpenicillin, M.P. 154–160° C.

EXAMPLE 3

(—)-α-Phenyl-α-methyl-β-acetoxyethylpenicillin

To a mixture of 21.6 g. of 6-aminopenicillanic acid, 9.2 g. of sodium bicarbonate and 600 ml. of H₂O cooled to 5° C., 26.4 g. of (—)-α-acetoxymethyl-α-phenyl-propionyl chloride in 100 ml. of acetone and 18 g. of NaHCO₃ in 200 ml. of H₂O are added dropwise with stirring. The mixture is allowed to stand for 1 hour at room temperature, then washed with diethyl ether; the aqueous phase is cooled to 0° C., adjusted to pH 2.5 with N HCl and extracted with diethyl ether. The ether solution is dried over Na₂SO₄, filtered, and adjusted to pH 7 with an ether solution of dibenzylethylenediamine. Yield 49 g. of dibenzylethylenediamine salt of (—)-α-phenyl-α-methyl-β-acetoxyethylpenicillin, M.P. 85–86° C.

EXAMPLE 4

α-Phenyl-α-n-butyl-β-bromoethylpenicillin

Into 100 ml. of glacial acetic acid a stream of gaseous anhydrous hydrogen bromide is bubbled at room temperature, saturation is completed at 0.5° C. Then 20.4 g. of α-phenyl-α-n-butyl-β-propionolactone dissolved in the minimum amount of acetic acid is added at 0° C. dropwise with stirring. The temperature rises to 10–20° C. The mixture is allowed to stand 2 hours at room temperature and then warmed at 80° C. for 2 hours. The organic solvent is distilled off in vacuo and the oil residue is taken up with diethyl ether; the organic solution is washed until neutral to Congo red, dried over Na₂SO₄ and filtered; the solvent is evaporated to give 25.3 g. of α-phenyl-α-n-butyl-β-bromopropionic acid; M.P. 100–102° C. which, reacted with thionyl chloride, gives the corresponding acid chloride.

A solution of 17 g. of 6-aminopenicillanic acid in 200 ml. of anhydrous chloroform is treated with 24 g. of α-phenyl-α-n-butyl-β-bromopropionyl chloride in 100 ml. of anhydrous chloroform substantially as described in Example 2. Ten grams of potassium α-phenyl-α-n-butyl-β-bromoethylpenicillin are obtained; M.P. 120–130° C. The corresponding dibenzylethylenediamine salt melts at 120–123° C.

EXAMPLES 5–8

Following the same procedure as described in Examples 1 and 3 the following penicillins were obtained:

$$R'-\underset{\underset{CH_2OCOCH_3}{|}}{\overset{\overset{R}{|}}{C}}-CO-6AP$$

| R | R' | Salt | M.P., °C. | Yield, percent |
|---|---|---|---|---|
| C₂H₅ | C₂H₅ | DED | 106–110 | 32 |
| C₆H₅ | i-C₃H₇ | DED | 115–123 | 35.1 |
| C₆H₅ | i-C₃H₇ | Na | (¹) | 91.2 |
| C₆H₅ | n-C₄H₉ | DED | 130–135 | 42 |

¹ 160° C. dec.

The sodium salts are prepared by extracting with a solution of NaHCO₃ the ether solution of the penicillin until pH 6.5 is reached. The aqueous solution is freeze-dried, the residue is taken up with anhydrous acetone, the inorganic salts are filtered and the solvent removed.

EXAMPLE 9

According to the procedure described in Examples 2 and 4 the following penicillins are prepared:

$$R'-\underset{\underset{CH_2X}{|}}{\overset{\overset{R}{|}}{C}}-CO-6AP$$

| R | R' | X | Salt | M.P., °C. | Yield, percent |
|---|---|---|---|---|---|
| C₂H₅ | C₂H₅ | Br | DED | 118–120 | 50 |
| C₆H₅ | C₂H₅ | Br | Free base | 110–120 | 63 |
| C₆H₅ | C₂H₅ | Br | DED | 123–125 | 40 |
| C₆H₅ | C₂H₅ | Br | Na | 116–125 | 70 |
| C₆H₅ | C₆H₅ | Br | DED | (¹) | 35 |
| C₆H₅ | C₆H₅ | Br | K | 115–130 | 67 |
| C₆H₅CH₂ | C₆H₅ | Br | K | 175–185 | 62 |
| C₂H₅ | C₂H₅ | Cl | DED | 128–132 | 42 |
| C₂H₅ | C₂H₅ | Cl | K | 110–120 | 65 |
| C₆H₅ | CH₃ | Br | DED | 118–122 | 37 |

¹ 155° C. dec.

We claim:
1. A member selected from the group consisting of the acids of the formula:

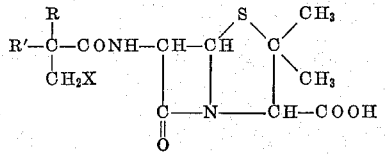

wherein R and R' are members of the class consisting of lower alkyl, phenyl and benzyl and X is a member of the class consisting of halogen and acetoxy and its sodium, potassium, calcium, aluminum, and ammonium salts and non-toxic substituted ammonium salts with an amine selected from the group consisting of tri(lower)alkylamines, procaine, dibenzylamine, N-benzyl-β-phenethylamine, 1-ephenamine, N,N' - bis - dehydroabietylethylenediamine, N,N'-dibenzylethylenediamine and dehydroabietylamine.
2. α-Benzyl-α-phenyl-β-acetoxyethylpenicillin.
3. α-Phenyl-α-ethyl-β-bromoethylpenicillin.
4. α-Phenyl-α-butyl-β-bromoethylpenicillin.
5. α,α-Diethyl-β-chloroethylpenicillin.
6. α-Phenyl-α-isopropyl-α-bromoethylpenicillin.
7. α-Phenyl-α-butyl-β-acetoxyethylpenicillin.
8. α-Phenyl-α-butyl-β-bromoethylpenicillin dibenzylethylenediamine salt.
9. α,α-Diethyl-β-chloroethylpenicillin dibenzylethylenediamine salt.
10. α-Phenyl - α - isopropyl-β-bromoethylpenicillin dibenzylethylenediamine salt.
11. A member of the group consisting of a penicillin compound of the formula:

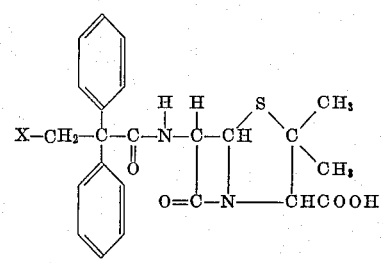

wherein X represents halogen.

References Cited by the Examiner
UNITED STATES PATENTS
| | | | |
|---|---|---|---|
| 3,025,290 | 3/1962 | Doyle et al. | 260—239.1 |
| 3,116,285 | 12/1963 | Celmer et al. | 260—239.1 |
| 3,157,639 | 11/1965 | Doyle et al. | 260—239.1 |

FOREIGN PATENTS
| | | |
|---|---|---|
| 880,042 | 10/1961 | Great Britain. |
| 900,666 | 7/1962 | Great Britain. |

OTHER REFERENCES
"Hackh's Chemical Dictionary, page 21, second edition, 1937.

Jour. Amer. Medical Assoc., page 466, May 24, 1958.

ALEX MAZEL, *Primary Examiner.*

NICHOLAS RIZZO, WALTER A. MODANCE, HENRY R. JILES, J. W. ADAMS, *Examiners.*